United States Patent
Park et al.

(10) Patent No.: US 7,267,046 B2
(45) Date of Patent: Sep. 11, 2007

(54) BREAD MAKER

(75) Inventors: Jae-ryong Park, Suwon (KR); Yong-hyun Kwon, Suwon (KR); Chul Kim, Anyang (KR); Tae-uk Lee, Suwon (KR); Han-jun Sung, Suwon (KR); Jang-woo Lee, Suwon (KR); Dong-bin Lim, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 392 days.

(21) Appl. No.: 10/805,477

(22) Filed: Mar. 22, 2004

(65) Prior Publication Data

US 2004/0261628 A1 Dec. 30, 2004

(30) Foreign Application Priority Data

May 7, 2003 (KR) ...................... 10-2003-0029088

(51) Int. Cl.
*A47J 27/62* (2006.01)
*A47J 37/01* (2006.01)

(52) U.S. Cl. ........................... 99/348; 99/467; 99/353; 99/426

(58) Field of Classification Search ................. 99/393, 99/467, 474, 476, 348, 426, 427, 353; 126/275 R, 126/275 E, 273 R, 20, 21 A; 219/391, 395, 219/400, 401

See application file for complete search history.

(56) References Cited

U.S. PATENT DOCUMENTS 5,947,009 A 9/1999 Hedenberg 6,056,381 A * 5/2000 Turner .................... 312/351

FOREIGN PATENT DOCUMENTS

| KR | 90-2707 | 3/1990 |
|---|---|---|
| KR | 90-4466 | 3/1990 |
| KR | 90-5774 | 3/1990 |
| KR | 91-17802 | 11/1991 |
| KR | 2001-32188 | 4/2001 |
| KR | 2002-53646 | 7/2002 |
| KR | 2002-57012 | * 7/2002 |
| WO | 99/25467 | 5/1999 |

* cited by examiner

*Primary Examiner*—Reginald L. Alexander
(74) *Attorney, Agent, or Firm*—Staas & Halsey LLP (57) ABSTRACT

A bread maker including a main body forming an oven compartment; upper and lower kneading drums spaced from each other in upper and lower parts inside the oven compartment to hold opposite ends of a mixing bag, respectively, and to wind opposite ends of the mixing bag is provided. Further, a pair of tray members is disposed between the upper and lower kneading drums facing each other to form a slit to pass the mixing bag therethrough. The bread maker also includes tray holder members to be combined with opposite ends of a pair of tray members; a pair of guides mounted on inner sidewalls of the oven compartment facing each other to slidably guide the tray holder members by being slidingly combined with the tray holder members; and a shock absorber between the tray holder member and the guide. Accordingly, the shock absorber between the guide and the tray holder member prevents the tray holder member from minute movement while placed in the guide. Consequently, noise occurring due to direct contract of the guides with the tray holder members can be prevented, thereby providing the user with an improved and reliable bread maker.

18 Claims, 7 Drawing Sheets

BREAD MAKER

CROSS-REFERENCE TO RELATED APPLICATIONS

This application claims the benefit of Korean Application No. 2003-29088, filed May 7, 2003, in the Korean Intellectual Property Office, the disclosure of which is incorporated herein by reference.

BACKGROUND OF THE INVENTION

1. Field of the Invention

The present invention relates to a bread maker, more particularly, to a bread maker in which noise occurring due to a minute movement of a tray member seated in an oven compartment is reduced.

2. Description of the Related Art

Generally, making bread is a complicated process that bread is made by using a bread maker, which automatically performs multiple steps such as kneading, leavening, and baking raw materials of the bread.

For example, a bread maker disclosed in Korean Patent Publication No. 2001-32188 includes, a housing forming an external structure of a bread maker; a door provided to the housing; and a Liquid Crystal Display ("LCD") display part provided to a side front part of the housing.

Inside the housing, towards upper and lower parts of the housing are placed upper and lower rollers, which are rotatably disposed in parallel to wind opposite ends of a mixing bag. Between the upper and lower rollers is placed a pair of dough-blocking members to prevent the raw materials kneaded in the mixing bag from moving to the upper roller.

Between the dough-blocking members and the lower roller is provided a baking tray, which can be drawn out, to contain kneaded materials therein.

The baking tray is of a box shape having a top opening formed with combination of a stationary part and a movable part that are symmetrical to one another. Here, the movable part is combined with pivot holders via pivot elements and/or techniques.

According to this configuration, the raw materials contained in the mixing bag are reciprocated up and down via the upper and lower rollers during a kneading process, thereby being kneaded between the dough-blocking members and the baking tray. After the kneading process is completed, the mixing bag is removed and dough contained in the baking tray is baked.

However, according to the conventional bread maker, the mixing bag is moved up and down during the kneading process through the slit of the baking tray formed between the stationary and movable parts. As a result, the baking tray seated inside the housing is also moved up and down. Therefore, inner surfaces of the housing in which the baking tray is seated and the baking tray are in direct contact with each other, thereby, causing noise during the bread making process.

In other words, the conventional bread maker presents a problem because as the baking tray is slightly moved up and down during the kneading process, the baking tray is in direct contact with the inner surface of the housing, and as a result, makes noise.

SUMMARY OF THE INVENTION

Accordingly, it is an aspect of the present invention to provide a bread maker in which noise occurring due to a minute movement of a tray member seated in an oven compartment can be reduced.

The foregoing and/or other aspects of the present invention are achieved by providing, a bread maker comprising: a main body forming an oven compartment provided with upper and lower kneading drums which are placed spaced from each other in upper and lower parts of the oven compartment to hold opposite ends of a mixing bag, respectively, and to wind the mixing bag; a pair of tray members disposed between the upper and the lower kneading drums facing each other to form a slit to pass the mixing bag therethrough; tray holder members combined with opposite ends of the pair of tray members; a pair of guides mounted on inner sidewalls of the oven compartment facing each other to slidably guide the tray holder members by slidingly combining with the tray holder members; and a shock absorber introduced between the tray holder member and the guide.

According to another aspect of the invention, the shock absorber is adhered to one of the tray holder member and the guide.

Additional aspects and advantages of the invention will be set forth in part in the description which follows and, in part, will be obvious from the description, or may be learned by practice of the invention.

According to yet another aspect of the invention, the guide comprises: a mounting surface mounted on an inner sidewall of the oven compartment; a seating surface extending from the lower edge of the mounting surface to accommodate the lower surface of the tray holder member; and an upper surface extending from the upper edge of the mounting surface and oppositely spaced from the seating surface by a predetermined distance. The upper surface is formed with a narrow part of a width narrower than the transverse width of the seating surface and a broad part of the same width as the width of transverse width of the seating surface.

According to an aspect of the invention, the pair of tray members includes a stationary tray member to be mounted on the tray holder member and a movable tray member to be movably mounted on the tray holder member. According to another aspect of the invention, the narrow part of the upper surface is almost the same length as the transverse width of the movable tray member.

According to another aspect of the invention, the shock absorber comprises: a first shock absorber adhered to the inner surface of the broad part of the upper surface of the pair of guides; and a second shock absorber adhered to the seating surface of the pair of guides.

According to another aspect of the invention, the shock absorber includes a nonmetal insulation material with elasticity.

BRIEF DESCRIPTION OF THE DRAWINGS

The above and/or other aspects and advantages of the invention will become apparent, and more readily appreciated from the following description of the preferred embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout.

Figure 1:
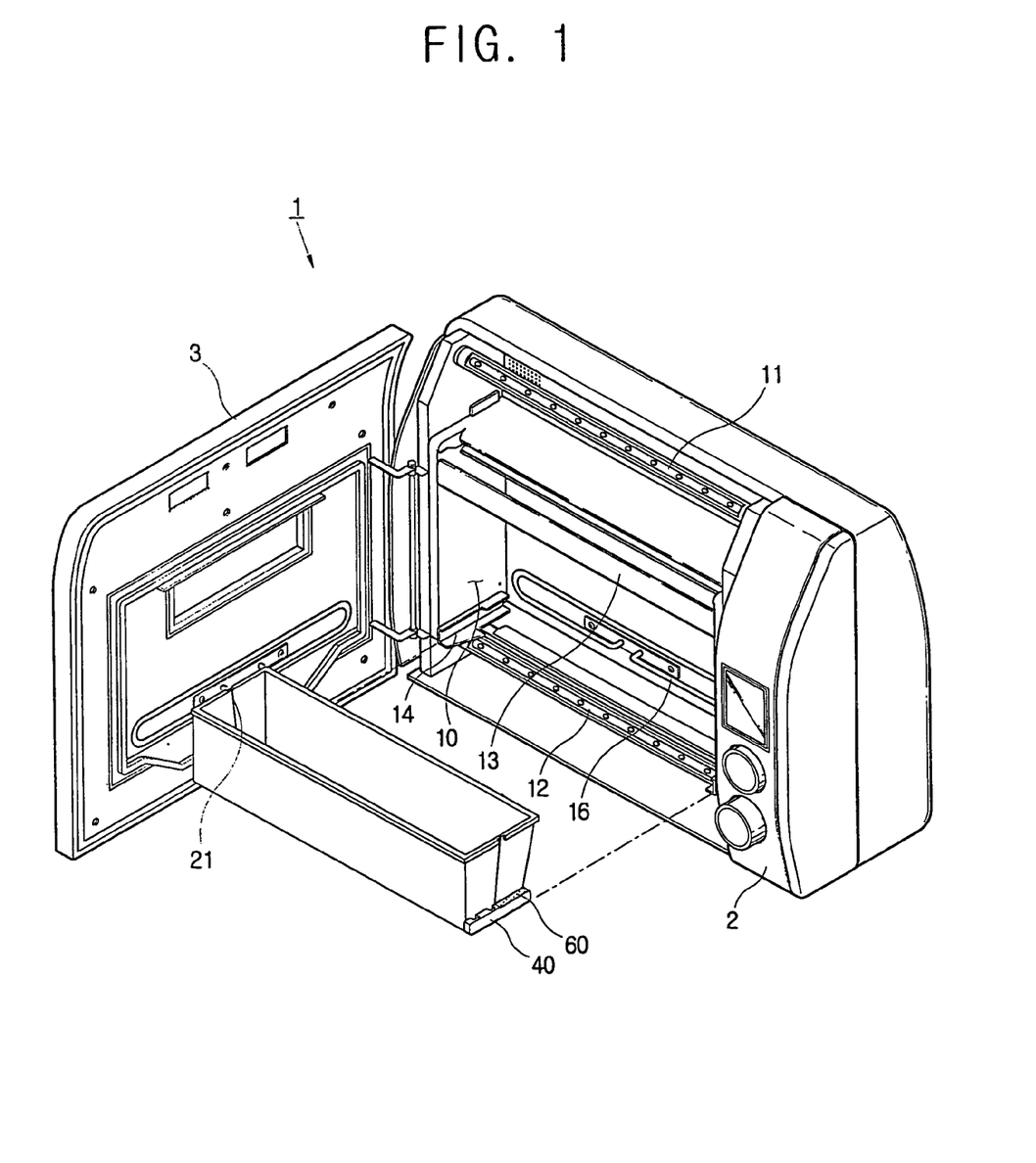
FIG. 1 is a perspective view to illustrate a drawn-out state of a baking tray assembly of a bread maker according to a first embodiment of the present invention.

FIG. 1 is a perspective view of a bread maker provided with a baking tray according to an aspect the present invention. As shown in FIG. 1, a bread maker according to an embodiment of the present invention, comprises: a main body 1 provided with an oven compartment 10; a door 3 in the front of the main body 1 to rotatably open and close a front opening of the oven compartment 10; and an operation display panel 2 provided at a side portion of the front of the main body 1 to display an operation state of the main body 1.

Further, towards the upper and lower parts inside the oven compartment 10 are placed upper and lower kneading drums 11 and 12, which are disposed in parallel and wind upper and lower ends of a mixing bag filled with raw materials needed for making the bread. The kneading drums 11 and 12 rotate in clockwise and counterclockwise directions. Between the upper and lower kneading drums 11 and 12 are placed a pair of dough-blocking members 13 (only one shown) to prevent the raw materials kneaded in the mixing bag from moving to the upper kneading drum 11.

A baking tray assembly 20, which can be drawn out from the oven compartment 10 that contains kneaded materials needed to make the bread is provided between the upper and lower kneading drums 11 and 12 towards the lower part of the oven compartment 10.

Figure 2:
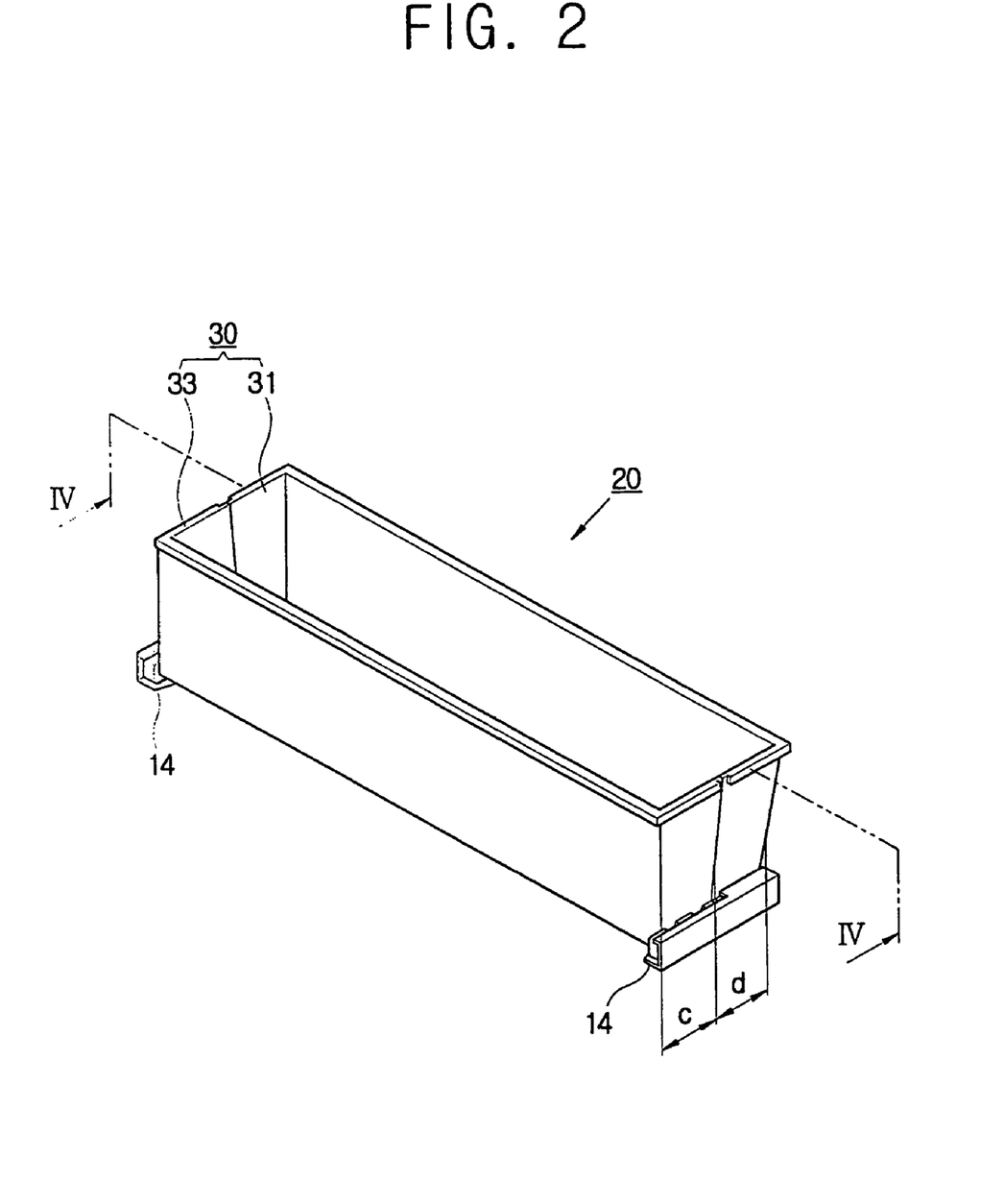
FIG. 2 is a combined perspective view of the baking tray assembly of the bread maker.

The baking tray 30 is of a box shape, with a top opening formed by combining stationary and movable tray members 31 and 33 of an "L" shaped section symmetrical to each other. Further provided is a pair of tray holder members 40 connected to opposite ends of the stationary and movable tray members 31 and 33, respectively.

At lower parts of opposite sidewalls of the stationary tray member 31, stationary projections (not shown) to be securely combined with the pair of tray holder members 40 are projected from exterior surfaces of the opposite sidewalls. At lower parts of opposite sidewalls of the movable tray member 33, combining projections 34 to be movably combined with the pair of tray holder members 40 are projected from exterior surfaces of the opposite sidewalls.

Figure 4:
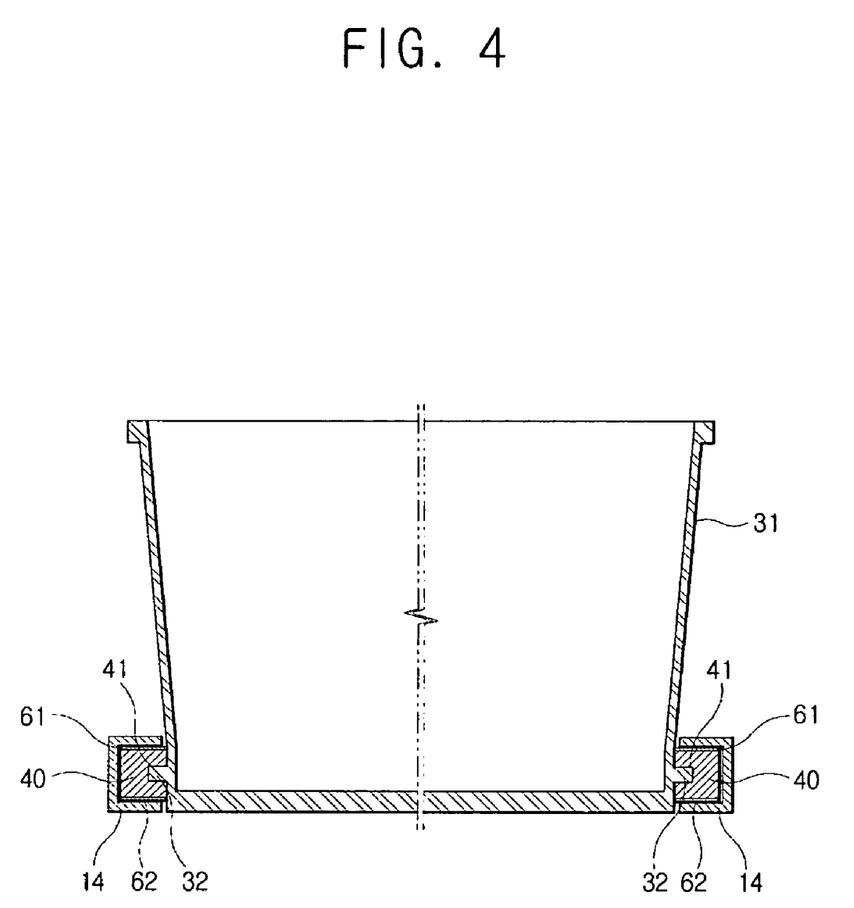
FIG. 4 is a sectional view of a baking tray assembly taken along line IV-IV as shown in FIG. 2.

The pair of tray holder members 40 are slidingly combined with guides 14 mounted facing each other on opposite inner sidewalls of the oven compartment 10. As parts to be combined with the stationary tray member 31, as shown in FIG. 4, are stationary projections accommodating parts 41 grooved on the tray holder member 40 where stationary projections 32 of the stationary tray member 31 are inserted. As parts to be combined with the movable tray member 33 are guide grooves 42 formed on the tray holder member 40 where the combining projections 34 of the movable tray member 33 are movably inserted.

Upon insertion of the stationary projections of the stationary tray member 31 in the stationary projections accommodating parts (not shown) of the tray holder member 40, the stationary tray member 31 is securely mounted on the tray holder member 40. Similarly, upon insertion of the combining projections 34 of the movable tray member 33 in the guide grooves 42 of the tray holder member 40, the movable tray member 33 is movably mounted on the tray holder member 40.

When the stationary and movable tray members 31 and 33 are mounted on the tray holder member 40 facing each other, the baking tray 30 which is of a box shape having a top opening to contain the raw materials for the bread is formed. Along the line at which the stationary and movable tray members 31 and 33 are combined, a slit 21 is formed.

The tray holder member 40 of the baking tray assembly 20 is slidingly combined with the guide 14 of the oven compartment 10 so that the baking tray assembly 20 can be slidably seated inside the oven compartment 10.

Accordingly, the guides 14 are employed to guide a sliding movement of the tray holder member 40 and form a pair facing each other on the opposite inner sidewalls of the oven compartment 10.

Figure 3:
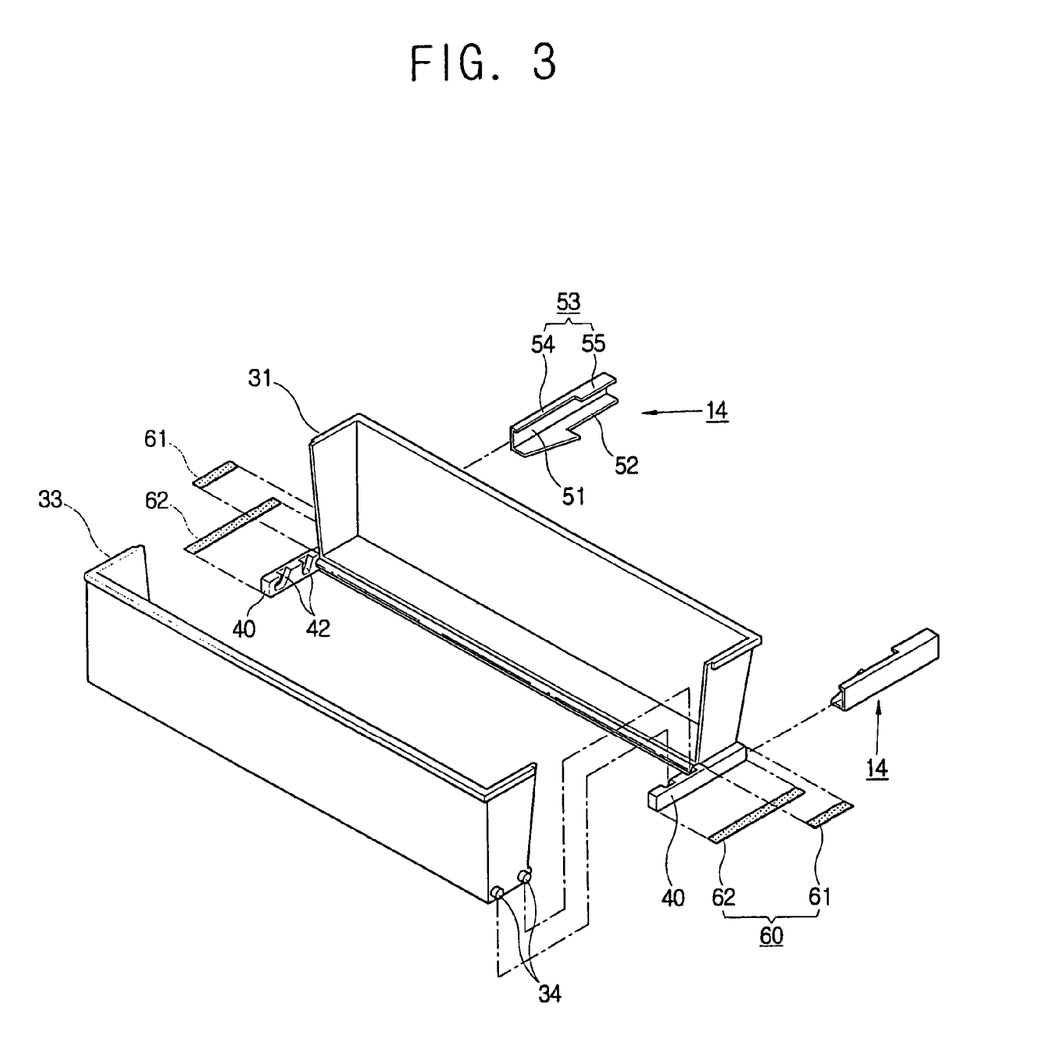
FIG. 3 is an exploded perspective view of a guide seated in an oven compartment of the bread maker, and the baking tray assembly of the bread maker.

As shown in FIG. 3, the guide 14 comprises: a mounting surface 51 mounted on each inner sidewall of the oven compartment 10; a seating surface 52 extending from the lower edge of the mounting surface 51 on which the lower surface of the tray holder member 40 is seated; and an upper surface 53 extending from the upper edge of the mounting surface 51 and oppositely spaced from the seating surface 52 by a predetermined distance.

The upper surface 53 of the guide 14 is formed of a narrow part 54 with a width narrower than the transverse width of the seating surface 52; and a broad part 55, which is almost the same width as the width of the transverse width of the seating surface 52.

The narrow part 54 is almost of the same length as the transverse width c of the movable tray member 33 as shown in FIG. 2 in the combination state of the guide 14 and the tray holder member 40. The broad part 55 is almost of the same length as the transverse width d (shown in FIG. 2) of the stationary tray member 31 as shown in FIG. 2.

When the baking tray assembly 20 is seated in the oven compartment 10 and the tray holder member 40 is slidingly combined with the guide 14, a shockabsorber 60 is provided between the guide 14 and the tray holder member 40 to prevent the tray holder member 40 from minute movement in the vertical direction during the winding of the upper and lower kneading drums 11 and 12 in clockwise and counterclockwise directions.

Figure 5:
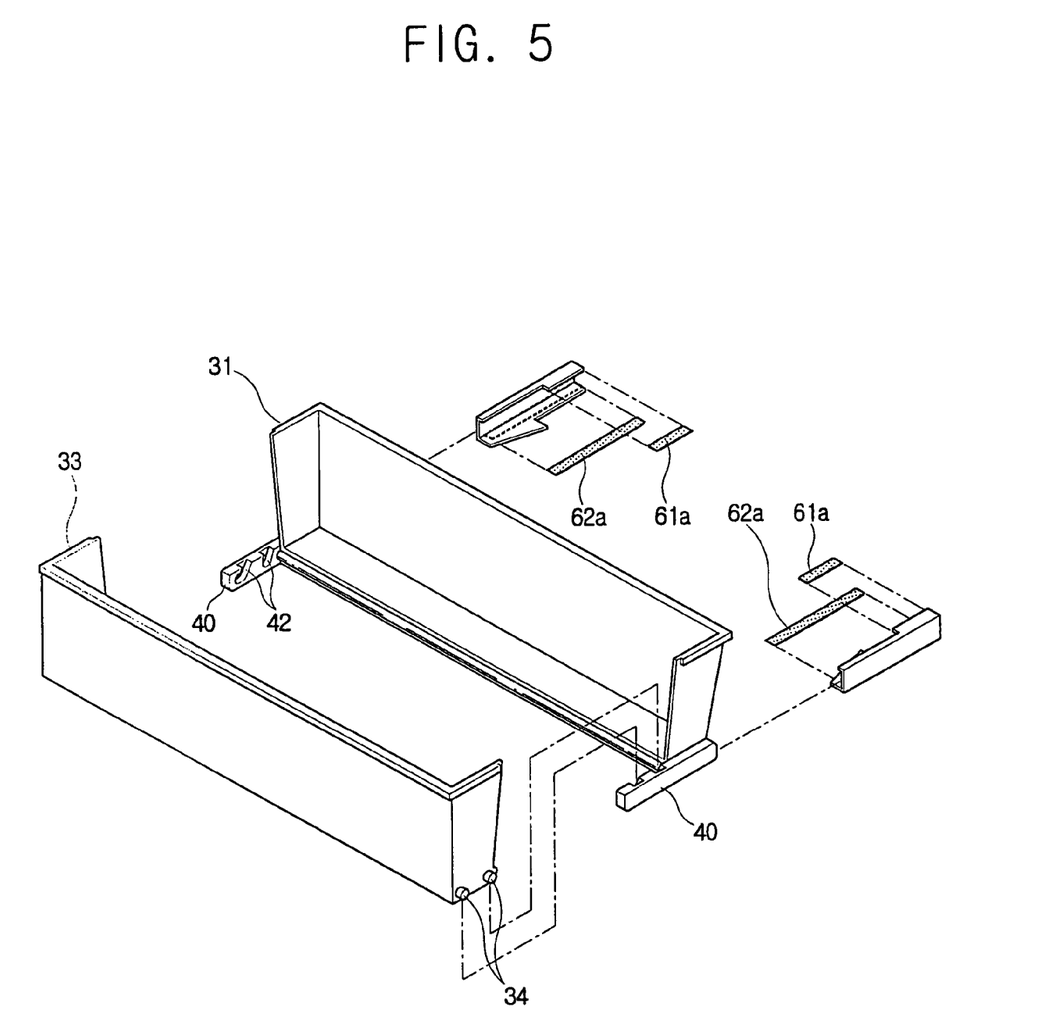
FIG. 5 is an exploded perspective view of the guide seated in the oven compartment, and the baking tray of the bread maker according to a second embodiment of the present invention.
Figure 6:
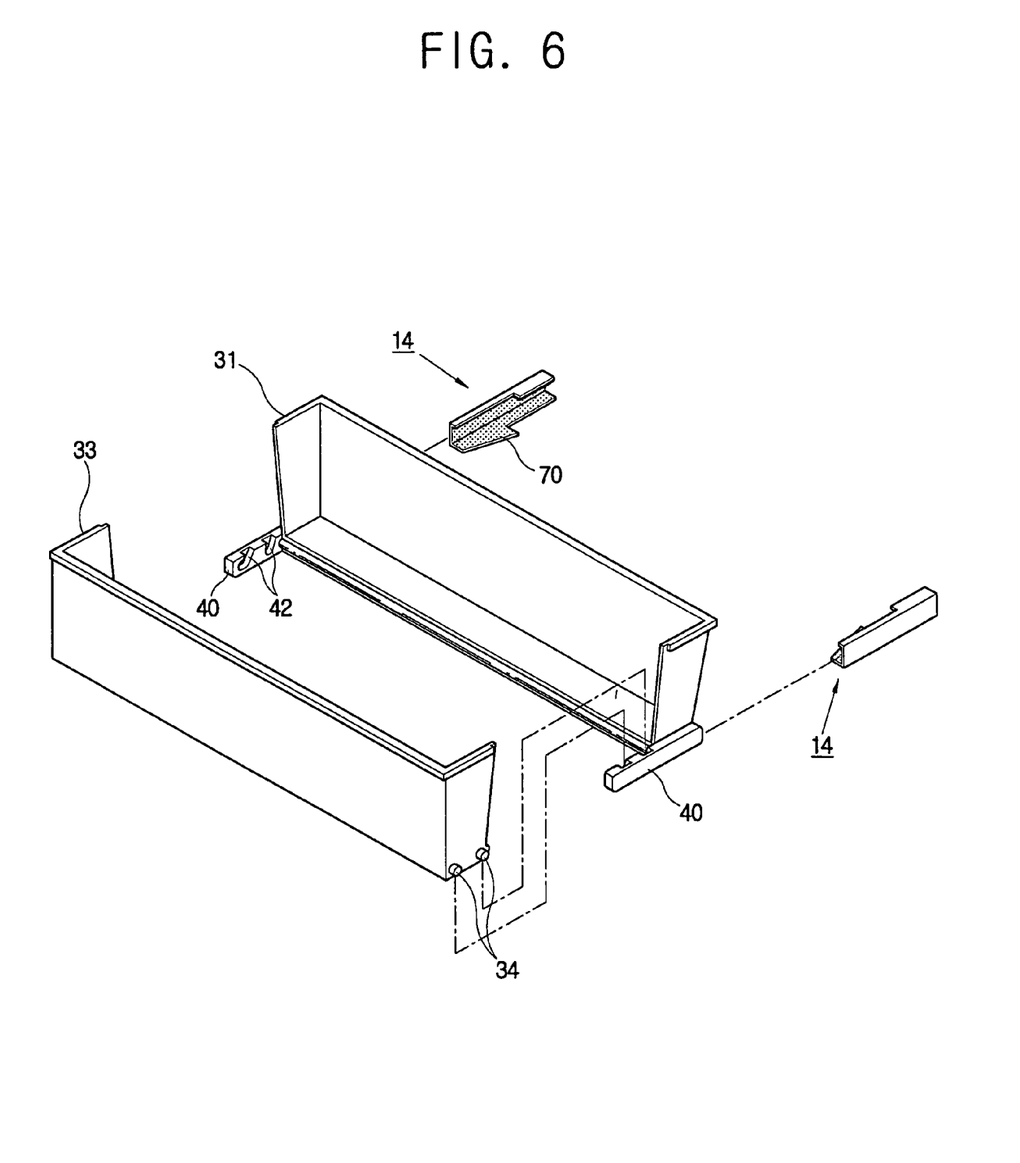
FIG. 6 is an exploded perspective view of the guide seated in the oven compartment, and the baking tray of the bread maker according to a third embodiment of the present invention.
Figure 7:
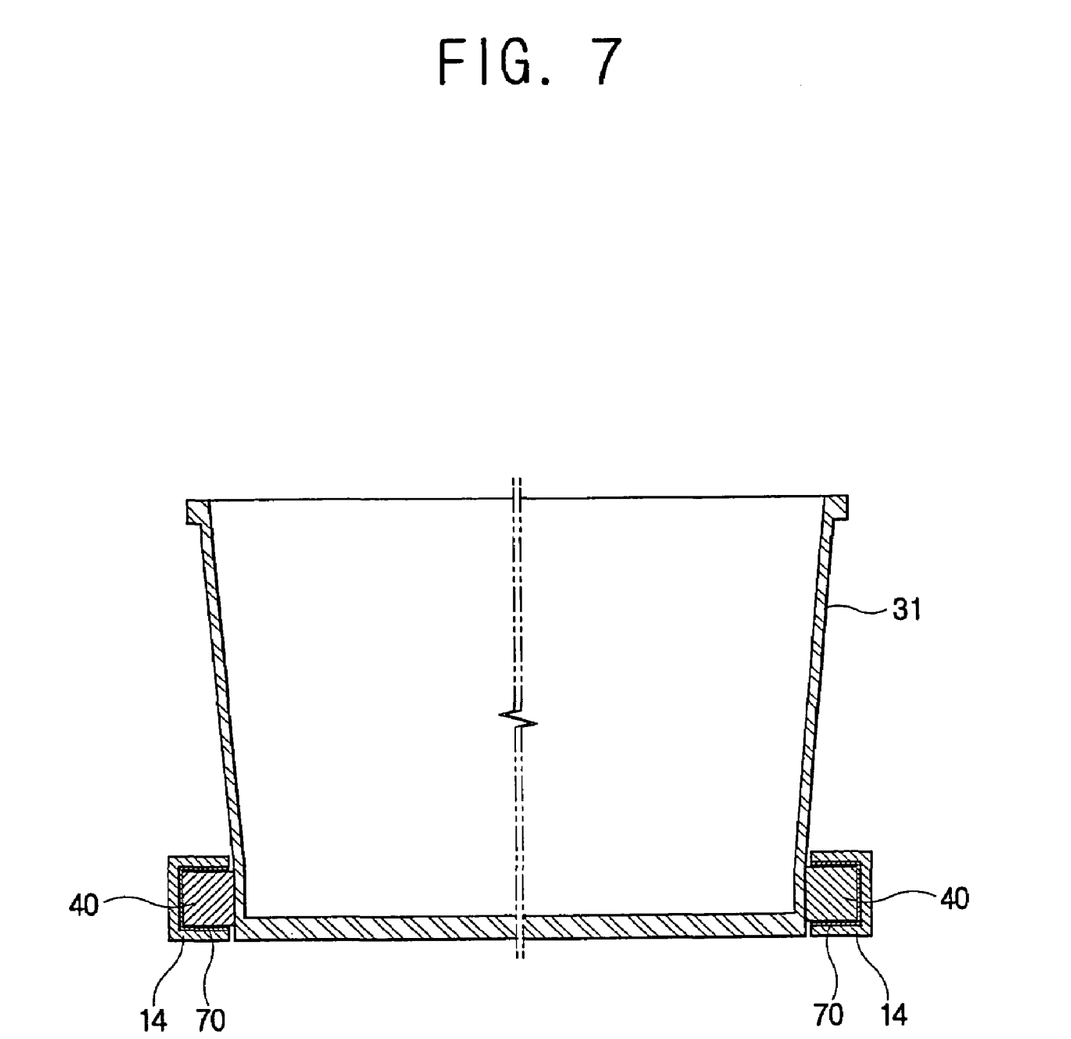
FIG. 7 is a sectional view of a baking tray assembly, taken along line IV-IV as shown in FIG. 2.

The shock-absorber 60 is made of nonmetal insulation material with a predetermined elasticity, for example, rubber, silicon or etc. As shown in FIGS. 3 and 4, according to an embodiment of the invention, the shock absorber 60, comprises: a first shock absorber 61 adhered to the upper surface of the tray holder member 40 in contact with the broad part 55 of the upper surface 53 of the guide 14; and a second shock absorber 62 adhered to the lower surface of the tray holder member 40. As shown in FIG. 5 illustrating a second embodiment of the invention, a first shock absorber 61a may be adhered to the inner surface of the broad part 55 of the upper surface 53 of the guide 14, and a second shock absorber 62a may be adhered to the seating surface 52 of the guide 14. Further, as shown in FIGS. 6 and 7, nonmetal insulation material with a predetermined elasticity may be applied on surfaces which need the shock-absorbing material to provide the surfaces with a benefit similar to the one provided via the shock absorber 60 provided between the guide 14 and the tray holder member 40.

According to this configuration, one end of the mixing bag contained inside the oven compartment 10 is wound by the upper kneading drum 11. Then, the other end of the mixing bag passes through the pair of dough-blocking members 13 and the slit 21 formed at the bottom of the baking tray 30 and then is wound by the lower kneading drum 12. The mixing bag filled with raw materials for bread is reciprocated up and down by the upper and lower kneading drums 11 and 12 during the kneading process so that the raw materials for the bread are kneaded between the pair of dough-blocking members 13 and the baking tray 30. After completing this kneading process, the mixing bag is released from the upper kneading drum 11 as the lower kneading drum 12 is the only kneading drum being rotated. Then, the mixing bag passes through the pair of dough-blocking members 13 and finally the slit 21 formed at the bottom of the baking tray 30. Here, when the mixing bag passes through the slit 21 of the baking tray 30, since the raw materials for the bread contained in the mixing bag cannot pass the slit 21 of the baking tray 30, the raw materials for the bread are separated from the mixing bag and contained in the baking tray 30. However, the mixing bag can pass the slit 21 of the baking tray 30 and is wound by the lower kneading drum 12. Thereafter, the raw materials for the bread contained in the baking tray 30 are baked by the baking heater 16.

According to an embodiment of the bread maker of the present invention, while the mixing bag is reciprocated up and down during the kneading process through the slit 21 formed between the stationary and movable tray members 31 and 33, the shock absorber 60 prevents minute movement of the tray holder member 40 in a vertical direction within the guide 14. Therefore, the noise occurring when the guide 14 and the tray holder member 40 are in direct contact can be prevented.

As described above, according to an embodiment of the present invention, the shock absorber 60 between the guide 14 and the tray holder member 40 prevents minute movement of the tray holder member 40 within the guide 14. Consequently, the noise occurring due to direct contact of the guide 14 and tray holder member 40 can be prevented, thereby, offering a reliable bread maker to a user.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A bread maker having a heating system and a kneading system including kneading drums, comprising:
    a main body forming an oven compartment in which an oven is accommodated, the kneading drums kneading dough in the oven compartment and the heating system generating heat in the oven to make bread from the dough;
    a pair of tray members provided facing each other to form a slit to pass a mixing bag containing raw materials for the bread;
    a pair of tray holder members combined with opposite ends of the pair of tray members;
    a pair of guides mounted on inner sidewalls of the oven compartment facing each other to slidably guide the tray holder members by slidingly combining with the tray holder members; and
    a shock absorber, introduced between the tray holder members and the guides, preventing the tray holder members from moving in a vertical direction during winding of the kneading drums.

2. The bread maker according to claim 1, wherein the shock absorber is adhered to one of the tray holder member and the guide.

3. The bread maker according to claim 1, wherein the pair of guides further comprising:
    a mounting surface mounted on an inner sidewall of the oven compartment;
    a seating surface extending from the lower edge of the mounting surface to accommodate the lower surface of the tray holder member; and
    an upper surface extending from the upper edge of the mounting surface oppositely spaced from the seating surface by a predetermined distance, the upper surface being formed with a narrow part of a width narrower than the transverse width of the seating surface and a broad part of the same width as the width of transverse width of the seating surface.

4. The bread maker according to claim 3, wherein the pair of tray members further comprising:
    a stationary tray member mounted on the tray holder member; and
    a movable tray member movably mounted on the tray holder member.

5. The bread maker according to claim 1, wherein the shock absorber further comprising:
    a first shock absorber adhered to the upper surface of the tray holder member and in contact with the broad part of the upper surface of the guide; and
    a second shock absorber adhered to the lower surface of the tray holder member.

6. The bread maker according to claim 1, wherein the shock absorber further comprising:
    a first shock absorber adhered to the inner surface of the broad part of the upper surface of the pair of guides; and
    a second shock absorber adhered to the seating surface of the pair of guides.

7. The bread maker according to claim 1, wherein the shock absorber includes a nonmetal insulation material with elasticity.

8. The bread maker according to claim 2, wherein the shock absorber includes a nonmetal insulation material with elasticity.

9. The bread maker according to claim 3, wherein the shock absorber includes a nonmetal insulation material with elasticity.

10. The bread maker according to claim 4, wherein the shock absorber includes a nonmetal insulation material with elasticity.

11. The bread maker according to claim 5, wherein the shock absorber includes a nonmetal insulation material with elasticity.

12. The bread maker according to claim 6, wherein the shock absorber includes a nonmetal insulation material with elasticity.

13. The bread maker according to claim 7, wherein nonmetal insulation material is applied on surfaces which need the shock-absorbing material.

14. The bread maker according to claim 4, further comprising:
 at least one stationary projection member provided to opposite exterior sidewalls of the stationary tray member to securely combine with the pair of tray holder members; and
 at least one combining projection member provided to opposite exterior sidewalls of the moveable tray member to moveably combine with the pair of tray holder members.

15. The bread maker according to claim 1, wherein the pair of tray holder members are slidingly combined with the pair of guides mounted on inner sidewalls of the oven compartment.

16. The bread maker according to claim 14, further comprising:
 a stationary projection accommodating part grooved on a first end of the pair of tray holder members to be combined with the least one stationary projection; and
 guide grooves formed on a second end the pair of tray holder members to allow insertion of the at least one combining projection member of the moveable tray member.

17. The bread maker according to claim 4, wherein the narrow part of the upper surface of the guide is of almost same length as the transverse width of the movable tray member.

18. A bread maker having a heating system, comprising:
 a main body forming an oven compartment in which an oven is accommodated, the heating system generating heat in the oven to make bread from dough;
 an upper and a lower kneading drum provided spaced from each other in upper and lower parts of the oven compartment to hold respective ends of a mixing bag and to wind the mixing bag;
 a pair of tray members disposed between the upper and the lower kneading dwms facing each other and forming a slit to allow the mixing bag to pass therethrough;
 a pair of tray holder members combined with opposite ends of the pair of tray members;
 a pair of guides mounted on inner sidewalls of the oven compartment facing each other to slidably guide the tray holder members by slidingly combining with the tray holder members; and
 a shock absorber, introduced between the tray holder members and the guides, preventing the tray holder members from moving in a vertical direction during winding of the mixing bag.

* * * * *

UNITED STATES PATENT AND TRADEMARK OFFICE
CERTIFICATE OF CORRECTION

| | | |
|---|---|---|
| PATENT NO. | : 7,267,046 B2 | Page 1 of 1 |
| APPLICATION NO. | : 10/805477 | |
| DATED | : September 11, 2007 | |
| INVENTOR(S) | : Jae-ryong Park et al. | |

It is certified that error appears in the above-identified patent and that said Letters Patent is hereby corrected as shown below:

Column 6, Line 29, in Claim 3, after "the" delete "width of".

Column 8, Line 14, in Claim 18, change "dwms" to --drums--.

Signed and Sealed this

Eleventh Day of March, 2008

JON W. DUDAS
*Director of the United States Patent and Trademark Office*